(12) United States Patent
Higby et al.

(10) Patent No.: US 6,517,395 B1
(45) Date of Patent: Feb. 11, 2003

(54) DRIVE TRAIN WITH A SINGLE DIAMETRAL PITCH PINION DRIVING TWO GEARS WITH DIFFERENT DIAMETRAL PITCHES

(75) Inventors: Jeffrey P. Higby, Grayslake, IL (US); Laverne W. Tatge, Kenosha, WI (US)

(73) Assignee: Bombardier Motor Corporation of America, Grant, FL (US)

( * ) Notice: Subject to any disclaimer, the term of this patent is extended or adjusted under 35 U.S.C. 154(b) by 8 days.

(21) Appl. No.: 09/722,915

(22) Filed: Nov. 27, 2000

(51) Int. Cl.[7] ............................................. B63H 20/14
(52) U.S. Cl. ............................. 440/75; 192/21; 74/378
(58) Field of Search ..................... 74/378, 379; 192/21, 192/51; 440/75

(56) References Cited

U.S. PATENT DOCUMENTS 3,882,814 A * 5/1975 Shimanckas ................ 440/75
4,827,789 A * 5/1989 Halliday et al. ......... 74/424.8 B

* cited by examiner

Primary Examiner—Ed Swinehart
(74) Attorney, Agent, or Firm—Ziolkowski Patent Solutions Group, LLC

(57) ABSTRACT

A marine propulsion unit drive train including two oppositely facing driven bevel gears having a common rotational axis and different numbers of teeth engaged with a bevel pinion drive gear having a single diametral pitch. Both driven gears have the same pitch diameter but different diametral pitches so that the driven gears rotate at different rates to boost performance when the propulsion unit is operated. The drive train is applicable to single propeller marine propulsion units and dual propeller stem drive units, and a method for fabricating a reduced-tooth driven gear to mesh with a drive pinion of a different diametral pitch is disclosed.

31 Claims, 3 Drawing Sheets

DRIVE TRAIN WITH A SINGLE DIAMETRAL PITCH PINION DRIVING TWO GEARS WITH DIFFERENT DIAMETRAL PITCHES

BACKGROUND OF THE INVENTION

This invention relates generally to drive trains and, more particularly, to drive train assemblies for outboard and stem drive marine engines.

Known outboard marine engines include a drive shaft which extends from an engine power head, through an exhaust case, and into an engine lower unit. The lower unit includes a gear case, and a propeller shaft extends through the gear case. The rotational axis of the propeller shaft is generally perpendicular to the rotational axis of the drive shaft. A bevel pinion drive gear affixed to the lower end of the drive shaft meshes with and drives two bevel driven gears diametrically opposed to each other and rotationally aligned with the propeller shaft. The driven gears have a same pitch diameter and a same number of teeth. Conventionally, the drive pinion and the driven gears have a common diametral pitch, or number of teeth per inch of pitch diameter.

A clutching member is slidingly connected to the propeller shaft and selectively engages one of the driven gears, thereby driving the propeller shaft in the same rotational direction as the engaged gear. One propeller shaft rotational direction associated with the first driven gear provides a forward thrust, and the other shaft rotational direction associated with the second driven gear provides reverse thrust.

The propeller is typically configured to maximize efficiency in forward gear since outboard marine engines are generally operated in forward gear relative to operation in a reverse gear. Consequently, at a given engine speed, the thrust generated by the propeller in forward gear generally is higher than the thrust generated by the propeller in reverse gear. To compensate for this lack of efficiency in reverse gear, a dual drive pinion arrangement could be utilized to provide for increasing the rotational speed of the propeller in reverse gear. In an outboard engine, however, such a dual pinion arrangement would result in an increased size of the engine lower unit, increased drag, additional parts, added complexity and extra cost to the lower unit assembly.

In addition, at least some known marine engine stern drives include dual propeller arrangements including an inner propeller shaft and an outer propeller shaft. A separate driven gear is provided to drive each of the inner and outer propeller shafts in opposite directions. Further, in at least some dual propeller arrangements, different speed propellers are utilized for increased performance and manueverability of watercraft. For example, one bevel drive pinion having two sets of teeth with different pitch diameters is utilized. Alternatively, two different pinions mounted to a single shaft are engaged with two different oppositely facing driven gears of different sizes. In this alternative configuration, one gear has a larger pitch diameter and more teeth than the other gear so that the larger gear rotates slower than the other gear. However, an increased size of one driven gear and a dual pitch pinion configuration result in a larger and more expensive gear case assembly.

BRIEF SUMMARY OF THE INVENTION

In an exemplary embodiment, a drive train includes a bevel drive pinion gear having a number of teeth and a diametral pitch, a first driven gear having a number of teeth and a diametral pitch, and second driven gear having a number of teeth and a diametral pitch. As is conventional, the drive pinion gear and the first driven gear have equal diametral pitches. The diametral pitch of the second driven gear, however, is different than the diametral pitch of the pinion gear and the first driven gear. The first and second driven gears are simultaneously engaged with the drive pinion gear and rotate about a common axis, and because of the different diametral pitches of the first and second driven gears, a rotational output of the first driven gear is different than the rotational output of the second driven gear. Thus, for example, when applied to a single propeller marine propulsion system at a given engine speed, a propeller can be caused to rotate at a faster rate when operated in a reverse driven gear than when operated in a forward driven gear.

More specifically, the second driven gear has at least one or two less gear teeth than the first bevel driven gear which allows the second driven gear to rotate faster at a given speed than does the first driven gear, yet allows an adequate driving engagement despite the different diametral pitches of the first and second driven gears.

In exemplary embodiments for marine propulsion units, the drive train is configured for a single propeller outboard motor in a first embodiment and for a dual propeller stern drive in a second embodiment. The single propeller outboard motor embodiment includes a unitary shaft with the first and second driven gears selectively engageable with the propeller shaft. Therefore, a propeller is rotated faster in reverse for a given engine speed by changing a ratio of a reverse driven bevel gear and bevel drive pinion, but without adding a second bevel drive pinion or second set of bevel drive pinion teeth of different pitch diameters. By proper selection of the number of teeth on the reverse driven gear, reverse propeller thrust can be better optimized.

The dual propeller stern drive embodiment includes an inner propeller shaft and an outer propeller shaft, with a first driven gear attached to the inner propeller shaft and a second driven gear attached to the outer propeller shaft. A propeller is attached to each of the inner and outer propeller shafts. Both the driven gears are simultaneously driven by a single bevel pinion gear, and since the driven bevel gears have different numbers of teeth, the propellers rotate at different speeds. Because both driven bevel gears are the same diameter, however, gear case size is not affected. Cost and complexity of the bevel drive pinion are unaffected because a single bevel drive pinion with only one set of teeth is required. Increased motor performance is therefore provided at minimal cost, size, and complexity for a dual propeller stern drive.

In both single and dual propeller embodiments a unique gear development procedure permits two bevel gears of the same pitch diameter, but having different numbers of teeth, to engage a single bevel drive pinion with a single set of teeth having a single diametral pitch. A first gear machining summary, i.e., a listing of gear generator machine settings, is made of a drive pinion and a driven gear to serve as a baseline. A second gear machining summary is next created of another drive pinion and a driven gear in which the driven gear pitch diameter is set equal to the driven gear pitch diameter of the first machining summary but the driven gear has one or two less teeth. Gear generator machine settings for the desired reduced-tooth driven gear are approximated by averaging the first and second gear machine settings for driven gear, and particularly the settings that control tooth pressure angle are averaged. This averaging primarily modifies the pressure angle for the desired reduced-tooth driven gear which enables the driven gear to mesh effectively with the drive pinion of the first gear machining summary even though the diametral pitches of the drive pinion and reduced-tooth driven gears are different. Final gear machine settings are then selected by adjustment of the averaged driven gear settings to achieve an acceptable tooth contact pattern and driving arrangement between the drive pinion of the first gear machining summary and the reduced-tooth driven gear.

DETAILED DESCRIPTION OF THE INVENTION

While the invention is described in the context of a marine propulsion system, it is understood that the invention is applicable in a broader context wherein a rotational output of a bevel gear train is different for each of two oppositely facing driven gears is desirable. Therefore, the embodiments set forth herein are for illustrative purposes only, and the invention is not intended to be limited to application in a marine propulsion system.

Figure 1:
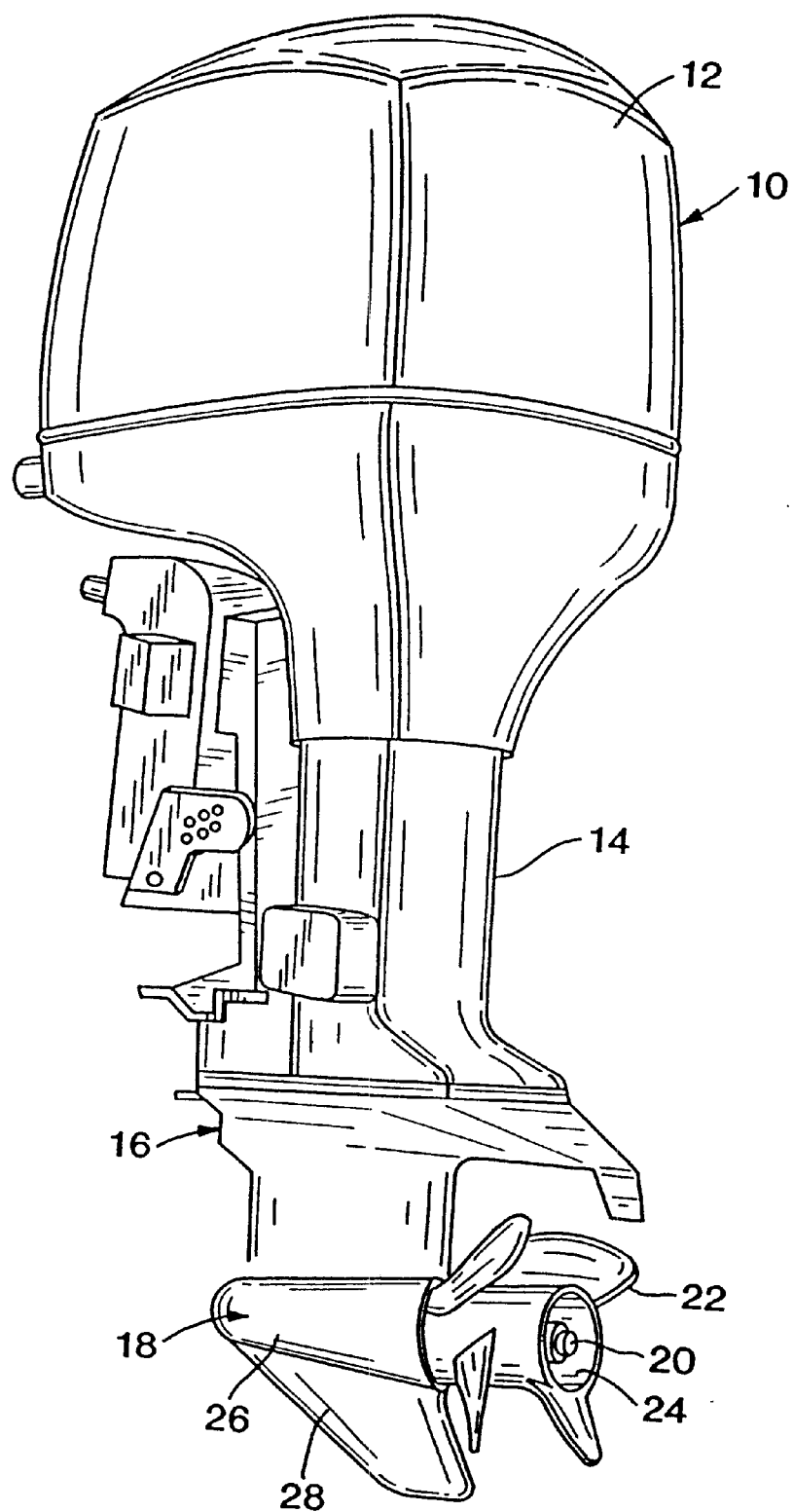
FIG. 1 is a perspective view of an outboard engine.

Referring now particularly to the drawings, FIG. 1 is a perspective view of an outboard motor, such as an outboard engine commercially available from Outboard Marine Corporation, Waukegan, Illinois. Outboard motor 10 includes a cover 12 which houses a power head (not shown), an exhaust housing 14, and a lower unit 16.

Lower unit 16 includes a gear case 18 which supports a propeller shaft 20. A propeller 22 is engaged to shaft 20. Propeller 22 includes an outer hub 24 through which exhaust gas is discharged. Gear case 18 includes a bullet, or torpedo, 26 and a skeg 28 which depends vertically downwardly from torpedo 26.

Figure 2:
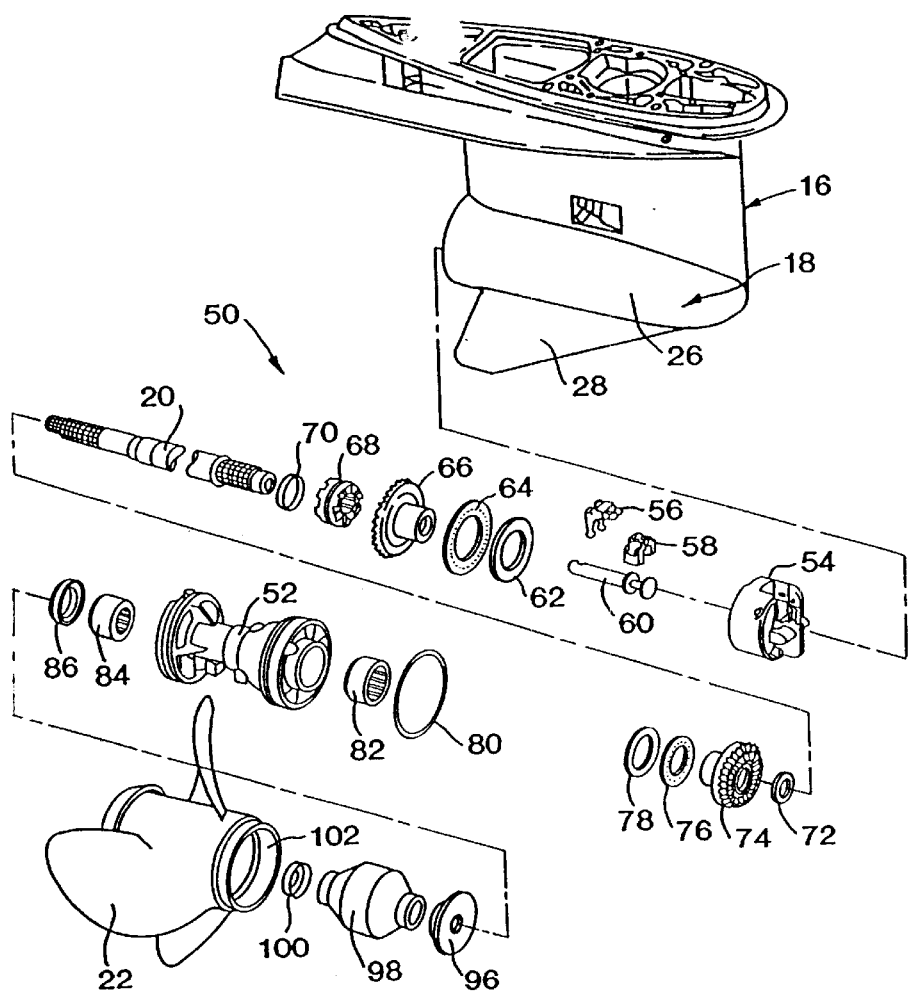
FIG. 2 is an exploded view of a lower unit and propeller shaft assembly.

FIG. 2 is an exploded view of lower unit 16 and a propeller shaft assembly 50 configured for standard rotation of propeller 22. Although components not shown in FIG. 2 typically are included in assembly 50, as is well known in the art, the components illustrated in FIG. 2 are shown by way of example only. Assembly 50 includes a housing and bearing assembly 54, and a shift lever 56, a shifter cradle 58, and a shaft 60. Assembly 50 also includes a forward gear thrust washer 62, a forward gear thrust bearing 64, a forward bevel gear 66, a shifter 68, and a spring 70. Assembled at the other end of shaft 20 is a propshaft thrust ring 72, a reverse bevel gear 74, a reverse gear thrust bearing 76, and a reverse gear thrust washer 78. An o-ring 80 and a bearing 82 are assembled at one end of propshaft housing 52, and a bearing 84 and a seal 86 are assembled at the other end of housing 52.

A thrust bushing 96, a bushing assembly 98, and a sleeve 100 are positioned to be located within propeller bore 102. Propeller shaft 20 extends through propshaft housing 52 and into propeller bore 102 so that propeller 22 can be secured thereto.

Figure 3:
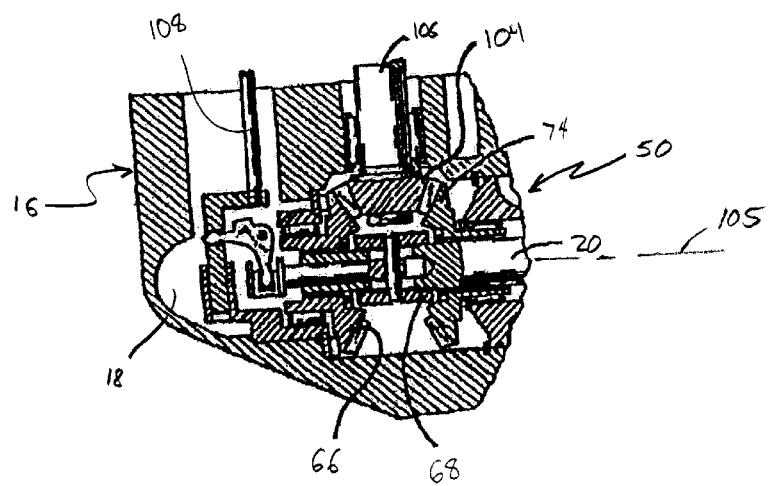
FIG. 3 is a partial cross-sectional view of a portion of the lower unit shown in FIG. 2.

Referring to FIG. 3, which is a partial cross-sectional view of a portion of lower unit 16, assembly 50 is located within gear case 18, except, of course, propeller 22. Driven bevel gears 66 and 74 are oppositely faced about a bevel drive pinion gear 104 and along a common rotational axis 105 coincident with a longitudinal axis of shaft 20. Pinion gear 104 is tightly secured to an engine drive shaft 106 and rotates therewith, and driven gears 66 and 74 are engagingly meshed with pinion drive gear 104. Therefore, when drive shaft 106 is rotated, driven gears 66 and 74 are simultaneously driven in opposite rotational directions by bevel pinion gear 104.

Shifter 68 engages propeller shaft 20 through splines and therefore rotates with propeller shaft 20, and shifter 68 is selectively positionable along the splines in response to an operator controlled linkage 108. Lugs projecting from each end of shifter 68 selectively engage mating lugs projecting from the face of each driven gear 66 and 74 as shifter 68 is moved longitudinally along the splines of propeller shaft 20. A rotation of propeller shaft 20 is therefore determined by manipulation, via linkage 108, of the position of shifter 68 relative to driven gears 66 and 74. When shifter 68 engages forward driven gear 66, propeller shaft 20 and attached propeller 22 rotate in a first rotational direction generating forward thrust from the engine. When shifter 68 engages reverse driven gear 74, propeller shaft 20 and attached propeller 22 rotate in a second rotational direction opposite the first rotational direction, thereby generating reverse thrust from the engine. When shifter 68 engages neither of driven gears 66, 74, propeller shaft 20 and propeller 22 do not rotate. As such, selective engine control between neutral, forward and reverse operating positions is achieved.

Reverse driven gear 74 has fewer (e.g., at least one or two fewer) teeth than forward driven gear 66. The number of teeth on forward driven gear 66 is unchanged from a conventional configuration to produce desired thrust characteristics when the engine is operated in forward gear. Because reverse driven gear 74 has fewer teeth than forward driven gear 66, propeller shaft 20 spins faster for a given engine rpm when the engine is operated in reverse gear than when the engine is operated in forward gear. Therefore, greater reverse thrust is generated as compared to at least some known engines at a same engine speed. By proper selection of the number of teeth on reverse driven gear 74 relative to forward driven gear 66, a reverse propeller thrust can be better optimized to improve watercraft manueverability when the engine is operated in reverse.

In an alternative embodiment, assembly 50 is configured for counter rotation of propeller 22. Therefore, the roles of driven gears 66 and 74 are reversed in operation. Consequently, driven gear 66 has fewer (e.g., one or two fewer) teeth than driven gear 74 so that propeller shaft 20 spins faster for a given engine rpm when the engine is operated in reverse gear than when the engine is operated in forward gear.

Figure 4:
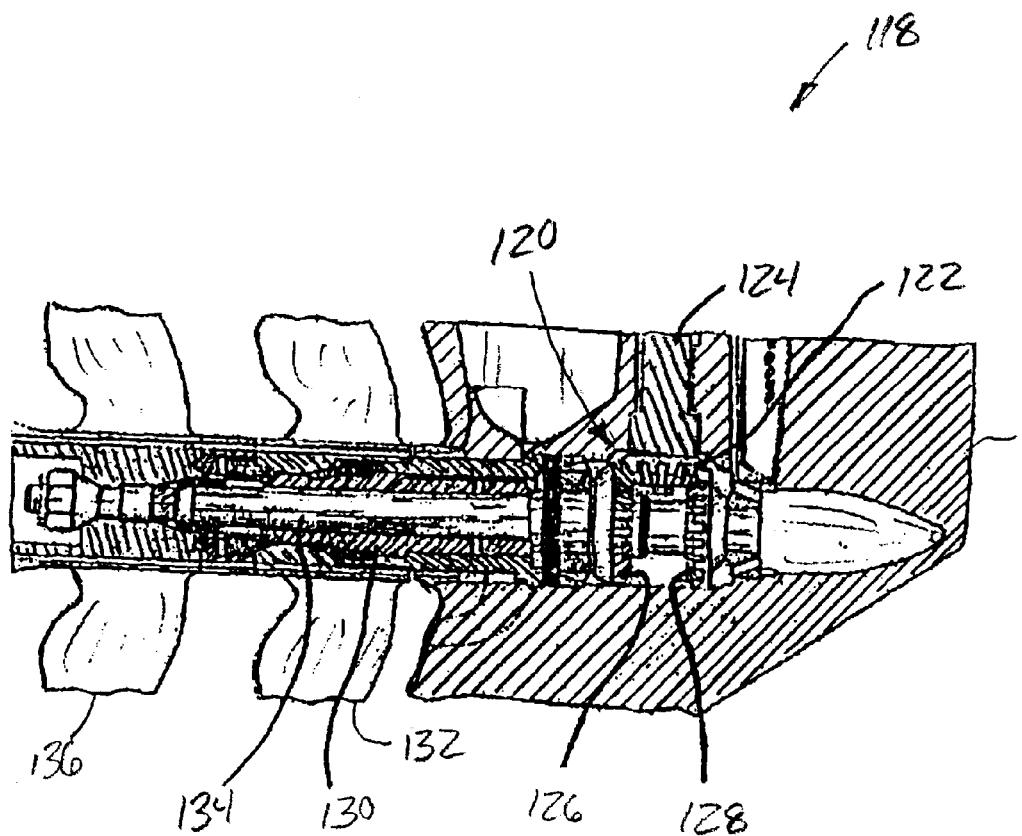
FIG. 4 is a partial cross-sectional view of a portion of a lower unit including a dual propeller arrangement.

FIG. 4 is a cross-sectional view of a portion of a dual propeller stern drive 118. A bevel drive pinion gear 122 is tightly secured to and rotates with a driveshaft 124 in a rotational direction determined by a conventional reversible transmission (not shown). Drive pinion 122 simultaneously engages and drives a first facing gear 126 in a first rotational direction and a second facing gear 128 in a second rotational direction opposite the first rotational direction. An outer propeller shaft 130 is tightly secured to driven gear 126 such that outer propeller shaft 130 and a propeller 132 attached to outer propeller shaft rotate together with gear 126. An inner propeller shaft 134 is tightly secured to gear 128 such that inner propeller shaft 134 and an attached propeller 136 rotate together with gear 128. Inner and outer propeller shafts 134 and 130 are disposed in coaxial and concentric relation with each other about a common axis of rotation.

One of propellers 132, 136 includes a right-hand pitch, and the other of propellers 132, 136 includes a left-hand pitch. Thus, when drive pinion 122 is rotated, both propellers 132, 136 act cooperatively to generate thrust in a common direction, i.e., forward or reverse.

By producing one of first or second facing gears 126, 128 with fewer teeth than the other, the oppositely rotating propellers 132, 136 will rotate at different speeds to optimize engine operation and thrust in forward and/or reverse operating conditions. However, because both driven gears 126, 128 are the same diameter, gear case size is not affected, and because a single bevel drive pinion 122 with only one set of teeth is required, cost and complexity of bevel drive pinion 122 are unaffected. An increased performance dual propeller stern drive is therefore provided at minimal cost, size, and complexity.

For either of gear case assembly 50 (shown in FIGS. 2 and 3) or gear case assembly 120 (shown in FIG. 4), a unique gear fabrication procedure permits two oppositely facing driven gears of the same pitch diameter, but having different numbers of teeth, to engage a single bevel drive pinion gear with a single set of teeth having a single diametral pitch. A gear design procedure to achieve an acceptable driving engagement of a driven gear having a reduced number of teeth and a given bevel pinion drive gear is set forth below. While a methodology for parallel axis gears referred to as "drop-tooth design" exists in the gear industry, (See, for example, U.S. Pat. No. 4,827,789), the drop-tooth design process is not directly applicable to a bevel gearing drive train because the applicable mathematics have yet to be developed to determine the necessary gear generator machine settings.

In order to fabricate two bevel gears with different numbers of teeth that mesh with a single bevel pinion drive gear, two gear machining summaries, i.e., listings of gear generator machine settings for producing a drive pinion gear and a driven gear having a desired gear tooth geometry, are utilized, and the machine settings for a desired driven gear with fewer teeth are selected based on an average of certain of the settings for the two gear machining summaries.

More specifically, a first gear machining summary is made of a drive pinion and a driven gear to serve as a baseline. A second gear machining summary is next created of another drive pinion and another driven gear in which the driven gear pitch diameter is set equal to the driven gear pitch diameter of the first summary but the driven gear has at least one or two less teeth. The diametral pitch, i.e., the number of teeth per inch of pitch diameter, of this second driven gear is therefore less than the diametral pitch of the first driven gear, and the resultant pinion drive gear of the second summary has a larger pitch diameter than the drive pinion of the first summary. Thus, the first and second gear machining summaries are created as though two separate pinion drive gears with associated driven gears were to be employed. By manipulating the first and second gear machining summary data relating to the associated driven gear, however, a desired drop-tooth gear may be fabricated to adequately mesh with the drive pinion of the first gear machining summary.

To achieve an acceptable meshing relationship between a bevel drive pinion gear and a drop-tooth driven gear having, for example, one or two less teeth than for which the drive pinion was designed, data pertaining to control of tooth pressure angle of the driven gear from the first and second gear machining summaries are averaged and used to fabricate a drop-tooth gear. Averaging the tooth pressure angle settings of the first and second gear machining summaries compensates for an increased pressure angle that would otherwise occur between the reduced-tooth driven gear and the pinion gear of the first gear machining summary and cause tooth contact between the pinion gear and the reduced-tooth driven gear at a top of the pinion gear teeth and a root of the driven gear teeth. The averaged settings for controlling tooth pressure angle of the driven gears from the first and second gear machining summaries produce a tooth contact pattern closer to the middle of the pinion gear teeth and the teeth of the reduced-tooth driven gear. Adjustments are then made, if necessary, from the averaged settings to produce a drop-tooth gear that meshes effectively with an original drive pinion even though the diametral pitches of the pinion drive gear and reduced-tooth driven gear are different.

For gear generators produced by The Gleason Works of Rochester, New York, for example, the ratio roll settings for the first and second driven gears are averaged between the requirements specified by the first and second gear machining summaries. Averaging the ratio roll settings, as will be recognized by those skilled in the art, provides an approximate setting for generating the desired reduced-tooth driven gear. Final machining settings for the reduced-tooth gear are determined by adjusting the averaged settings to optimize a tooth contact pattern between the drive pinion and the reduced-tooth driven gear.

It is recognized that gear machining summaries may be created by various proprietary software programs other then those provided by The Gleason Works that may be manipulated to approximate a gear summary for a drop-tooth bevel gear. Further, it is possible to create gear machining summary information manually from equations supplied by a gear generator manufacturer.

Drop-tooth driven gears are therefore provided to enhance performance of outboard and dual propeller drive systems by allowing differentiation in speed of rotation of the driven gears.

While the invention has been described in terms of various specific embodiments, those skilled in the art will recognize that the invention can be practiced with modification within the spirit and scope of the claims.

What is claimed is:

1. A drive train comprising:
   a bevel drive pinion gear having a single number of teeth and a diametral pitch;
   a first driven gear engaged with said pinion gear for rotation about an axis said first driven gear having a first number of teeth and a first diametral pitch;
   a second driven gear engaged with said pinion gear for rotation about said axis, said second driven gear having a second number of teeth and a second diametral pitch, said second diametral pitch different than said first diametral pitch.

2. A drive train in accordance with claim 1 wherein said second driven gear has at least one less gear tooth than said first driven gear.

3. A drive train in accordance with claim 1 wherein said second driven gear has at least two fewer gear teeth than said first driven gear.

4. A drive train in accordance with claim 1 wherein said drive train is configured for a marine propulsion unit.

5. A drive train in accordance with claim 4 wherein said drive train is configured for an outboard motor.

6. A drive train in accordance with claim 5 wherein said first driven gear comprises a forward gear and said second driven gear comprises a reverse gear.

7. A drive train in accordance with claim 4 wherein said drive train is configured for a stern drive.

8. A drive train in accordance with claim 7 wherein said drive train further comprises an inner propeller shaft and an outer propeller shaft, said first driven gear attached to said inner propeller shaft and said second driven gear attached to said outer propeller shaft.

9. A marine propulsion unit drive train comprising:
   a driveshaft;
   a bevel pinion drive gear attached to said driveshaft, said pinion gear comprising a plurality of teeth of a single pitch diameter;
   a first driven gear comprising a plurality of teeth and a second diametral pitch, said teeth of said first driven gear engageable with said teeth of said pinion gear for rotation in a first rotational direction about an axis of rotation;
   a first propeller shaft attached to said first driven gear;
   a second driven gear comprising a plurality of teeth and a third pitch diameter, said teeth of said second driven gear engageable with said gear teeth of said pinion gear for rotation in a second rotational direction about said axis of rotation, said third diametral pitch different from said second diametral pitch, and
   a second propeller shaft attached to said second gear.

10. A marine drive train in accordance with claim 9 wherein one of said first driven gear and said second driven gear comprises at least one fewer tooth than the other of said first driven gear and said second driven gear.

11. A marine drive train in accordance with claim 9 wherein one of said first driven gear and said second driven gear comprises at least two fewer teeth than the other of said first driven gear and said second driven gear.

12. A marine drive train in accordance with claim 9 wherein said first propeller shaft comprises an inner propeller shaft and said second propeller shaft comprises an outer propeller shaft.

13. A marine drive unit in accordance with claim 12 further comprising an aft propeller attached to said inner propeller shaft and a fore propeller attached to said outer propeller shaft and wherein said first driven gear is attached to said outer propeller shaft and said second driven bevel gear is attached to said inner propeller shaft.

14. A marine drive train in accordance with claim 9 wherein said driveshaft comprises an axis of rotation, said driveshaft axis of rotation generally perpendicular to said axis of rotation of said first driven gear.

15. A marine drive unit in accordance with claim 14 wherein said axis of rotation of said first driven gear is substantially horizontal.

16. A marine drive unit in accordance with claim 9 wherein said bevel pinion drive gear comprises a diametral pitch, said diametral pitch of said pinion drive gear substantially equal to said second diametral pitch.

17. A marine propulsion device comprising:
   a driving bevel pinion gear with a single set of gear teeth;
   a first facing driven bevel gear engaged with said driving gear for rotation about an axis, said first facing driven gear comprising a first number of teeth and a first diametral pitch;
   a second facing driven bevel gear engaged with said driving gear for rotation about said axis and located opposite of said first facing driven gear, said second facing driven gear comprising a second number of teeth and a second diametral pitch; said first diametral pitch different from said second diametral pitch; and
   at least one propeller shaft configured for selective coupling to at least one of said first driven gear and said second driven gear.

18. A marine propulsion device in accordance with claim 17 wherein said first facing driven gear has a fewer number of teeth than said second facing driven gear, such that at a given engine setting said propeller shaft rotates faster when said first facing driven gear is engaged to said propeller shaft than when said second facing driven gear is engaged to said propeller shaft.

19. A marine propulsion device in accordance with claim 18 wherein said second facing driven gear has at least one less gear tooth than said first facing driven gear.

20. A marine propulsion device in accordance with claim 18 wherein said second facing driven gear has at least two less gear teeth than said first facing driven gear.

21. A marine propulsion system in accordance with claim 17 wherein said bevel pinion driving gear comprises a diametral pitch, said diametral pitch of said pinion gear different from at least one of said first diametral pitch and said second diametral pitch.

22. A marine propulsion unit in accordance with claim 17 wherein said axis of rotation is coincident with an axis of said propeller shaft.

23. A marine propulsion device in accordance with claim 17 further comprising a shifter coupled to said shaft for selectively coupling said propeller shaft to one of said first driven gear and said second driven gear.

24. A marine propulsion device comprising:
   a driveshaft; and
   a gear case comprising:
      a driving bevel pinion gear affixed to said driveshaft and having a single set of gear teeth;
      a first facing rotating driven bevel gear engaged with said driving gear, said first facing driven gear comprising a first number of teeth and a first diametral pitch;
      a second facing rotating driven bevel gear located opposite of said first facing driven gear, said second facing driven gear comprising a second number of teeth and a second diametral pitch, said first diametral pitch different from said second diametral pitch; and
      a propeller shaft driven by one of said first facing driven gear and said second facing driven gear.

25. A marine propulsion device in accordance with claim 24 further comprising a propeller coupled to said propeller shaft, said propeller designed for maximum efficiency when rotating in a first rotational direction, said efficiency being greater than when rotating in the second rotational direction.

26. A marine propulsion device in accordance with claim 24 wherein said second driven gear has a fewer number of teeth than said first driven gear.

27. A marine propulsion unit in accordance with claim 24 wherein said propeller shaft comprises an inner propeller shaft and an outer propeller shaft, one of said inner propeller shaft and said outer propeller shaft coupled to said first driven gear, and the other of said inner propeller shaft and said outer propeller shaft coupled to said second driven gear.

28. A marine propulsion unit in accordance with claim 27 wherein said inner and outer propeller shafts are disposed in coaxial and concentric relation with each other about an essentially horizontal axis of rotation.

29. A marine propulsion unit in accordance with claim 28 wherein said at least one propeller comprises a right-hand pitch propeller securely attached to one of said inner and outer propeller shafts, and a left-hand pitch propeller securely attached to the other of said inner and outer propeller shafts.

30. A marine propulsion device in accordance with claim 29 wherein said second facing driven gear has at least one fewer tooth than said first facing driven gear.

31. A marine propulsion device in accordance with claim 29 wherein said second facing driven gear has at least two fewer teeth than said first facing driven gear.

* * * * *

UNITED STATES PATENT AND TRADEMARK OFFICE
CERTIFICATE OF CORRECTION

PATENT NO. : 6,517,395 B1
DATED : February 11, 2003
INVENTOR(S) : Higby et al.

It is certified that error appears in the above-identified patent and that said Letters Patent is hereby corrected as shown below:

Column 6,
Lines 49 and 52, delete "diametral pitch" and substitute therefor -- pitch diameter --;
Line 53, delete "diametral pitch" and substitute therefor -- number of teeth --;
Line 54, delete "diametral pitch" and substitute therefor -- number of teeth; and said first driven gear comprises a forward gear and said second driven gear comprises a reverse gear --;
Line 65, delete claim 6 in its entirety;

Column 8,
Lines 36 and 37, after the word "teeth" in line 36, delete "and a first diametral pitch";
Line 41, after the word "teeth", delete "and a second diametral pitch";
Lines 42 and 43, delete "diametral pitch" and substitute therefor -- number of teeth is -- and delete "diametral pitch" and substitute therefor -- number of teeth --;

Column 10,
Line 4, insert the following claims:

32. A marine engine drive train comprising: a pinion gear operatively engaged with a drive shaft; a first driven gear operatively engaged with the pinion gear and connected to a first driven shaft coupled to a first propeller, the first driven gear having a first set of teeth and first pitch diameter; a second driven gear operatively engaged with the pinion gear and connected to a second driven shaft coupled to a second propeller, the second driven gear having a second set of teeth and second pitch diameter, wherein the first set of teeth differ in number from the second set of teeth and the first and second pitch diameters are equal.
33. The drive train of claim 32 wherein the second driven gear has less teeth than the first driven gear.
34. The drive train of claim 33 wherein the second driven gear is configured to rotate, in relation to the pinion gear, faster than the first driven gear with respect to the pinion gear.
35. The drive train of claim 32 wherein the drive train is configured in an outboard motor.
36. The drive train of claim 32 wherein the first driven gear comprises a forward gear and the second driven gear comprises a reverse gear.
37. The drive train of claim 32 wherein the drive train is configured in a stern drive.
38. The drive train of claim 32 wherein the drive train is configured in a single propeller marine motor.
39. The drive train of claim 32 wherein the drive train is configured in a dual propeller marine motor.
40. The drive train of claim 39 wherein both propellers turn in both rotational directions.

UNITED STATES PATENT AND TRADEMARK OFFICE
CERTIFICATE OF CORRECTION

PATENT NO. : 6,517,395 B1
DATED : February 11, 2003
INVENTOR(S) : Higby et al.

It is certified that error appears in the above-identified patent and that said Letters Patent is hereby corrected as shown below:

41. The drive train of claim 32 wherein at least one propeller shaft is configured for selective coupling to at least on of the first driven gear and the second driven gear.
42. A drive train comprising: a pinion gear operatively engaged with a drive shaft, the pinion gear having opposing first and second sides; a first driven gear operatively engaged with the first side of pinion gear, the first driven gear having a first set of teeth and first pitch diameter; and a second driven gear operatively engaged with the second side of the pinion gear, the second driven gear having a second set of teeth and second pitch diameter, wherein the first set of teeth differ in number from the second set of teeth and the first and second pitch diameters are equal.
43. The drive train of claim 42 wherein the first and second driven gears rotate in opposite directions.
44. The drive train of claim 42 wherein the second driven gear has less teeth than the first driven gear.
45. The drive train of claim 44 wherein the second driven gear is configured to rotate, in relation to the pinion gear, faster than the first driven gear with respect to the pinion gear.
46. The drive train of claim 42 wherein the drive train is configured in an outboard motor.
47. The drive train of claim 42 wherein the first driven gear comprises a forward gear and the second driven gear comprises a reverse gear.
48. The drive train of claim 42 wherein the drive train is configured in a stern drive.
49. The drive train of claim 42 wherein the drive train is configured in a single propeller marine motor.
50. The drive train of claim 42 wherein the drive train is configured in a dual propeller marine motor.
51. The drive train of claim 50 wherein both propellers turn in both rotational directions.
52. The drive train of claim 42 wherein at least one propeller shaft is configured for selective coupling to at least on of the first driven gear and the second driven gear.
53. The marine propulsion device of claim 24 wherein said first driven gear has the same pitch diameter as said second driven gear.

Signed and Sealed this

Twenty-ninth Day of July, 2003

JAMES E. ROGAN
*Director of the United States Patent and Trademark Office*